(12) United States Patent
Hanyu

(10) Patent No.: US 6,929,314 B2
(45) Date of Patent: Aug. 16, 2005

(54) VEHICULAR BODY FRONT STRUCTURE (75) Inventor: Atsushi Hanyu, Yokosuka (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/737,830

(22) Filed: Dec. 18, 2003

(65) Prior Publication Data

US 2004/0145217 A1 Jul. 29, 2004

(30) Foreign Application Priority Data

Jan. 24, 2003 (JP) .................................... P 2003-016057

(51) Int. Cl.$^7$ ............................................ B62D 25/08
(52) U.S. Cl. ................................................ 296/203.02
(58) Field of Search ........................... 296/203.02, 204, 296/205, 193.09, 193.07

(56) References Cited

U.S. PATENT DOCUMENTS 5,577,796 A * 11/1996 Clausen ...................... 296/202
6,095,592 A * 8/2000 Nakatani ................. 296/187.09
6,203,099 B1 * 3/2001 Iwatsuki ...................... 296/204
2004/0155488 A1 * 8/2004 Saito ............................ 296/204

FOREIGN PATENT DOCUMENTS

| DE | 197 20 640 A1 | 10/1997 |
| EP | 0 919 453 A2 | 6/1999 |
| GB | 2 341 149 A | 3/2000 |
| JP | 4-310477 | 11/1992 |
| JP | 9-95260 | 4/1997 |

* cited by examiner

Primary Examiner—Dennis H. Pedder
(74) Attorney, Agent, or Firm—McDermott Will & Emery LLP (57) ABSTRACT A vehicle longitudinally extending front side member (1) has a rearwardly descending inclined portion (6) configured in an enclosure form in section with an upper wall (3) and a lower wall (4), the upper wall (3) being more rigid than the lower wall (4).

6 Claims, 8 Drawing Sheets

VEHICULAR BODY FRONT STRUCTURE

BACKGROUND OF THE INVENTION

1. Field of the Invention

The present invention relates to a vehicular body front structure.

2. Description of Related Art

A vehicular body includes a pair of vehicle-longitudinally extending front side members at vehicle-transversely left and right sides of a front compartment, and a pair of vehicle-longitudinally extending floor members at vehicle-transversely left and right sides of a tunnel portion of a floor panel disposed at the rear of the front compartment. Each front side member is connected to a corresponding floor member, so that the latter is configured as a connected extension of the former, via an inclined portion of the former rearwardly descending along an outline of a dashboard panel between the front compartment and the floor panel.

A collision impact may be imposed on a front end of the front side member, as a load thereto from ahead, causing the inclined portion to deform rearward, so that the dashboard panel may retreat into a cabin defined as a compartment above the floor panel.

Japanese Patent Application Laying-Open Publication No. 9-95260 has disclosed a vehicular body front structure having a reinforcement for connecting an upside of a rear portion of a front side member to an inclined portion via a smooth curvature, to prevent an over-retreat of a dashboard panel.

SUMMARY OF THE INVENTION

In this structure, the rear portion of the front side member is reinforced at the upside, and suppressed from deformation. Therefore, when exposed to a collision impact from ahead, the front side member little deforms, failing to absorb impact energy, thus transmitting the impact to the dashboard panel, causing this panel to over-deform, needing additional reinforcements for the panel, with resultant increase in weight and cost.

The present invention has been made with such points in view. It is an object of the invention to provide a vehicular body front structure including a front side member having an inclined portion adapted for efficient absorption of impact energy by deformation.

To achieve the object, according to an aspect of the invention, there is provided a vehicular body front structure including a vehicle-longitudinally extending front side member having a rearwardly descending inclined portion configured in an enclosure form in section with an upper wall and a lower wall, the upper wall being more rigid than the lower wall.

BRIEF DESCRIPTION OF THE DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention, with reference to the accompanying drawings.

Figure 1:
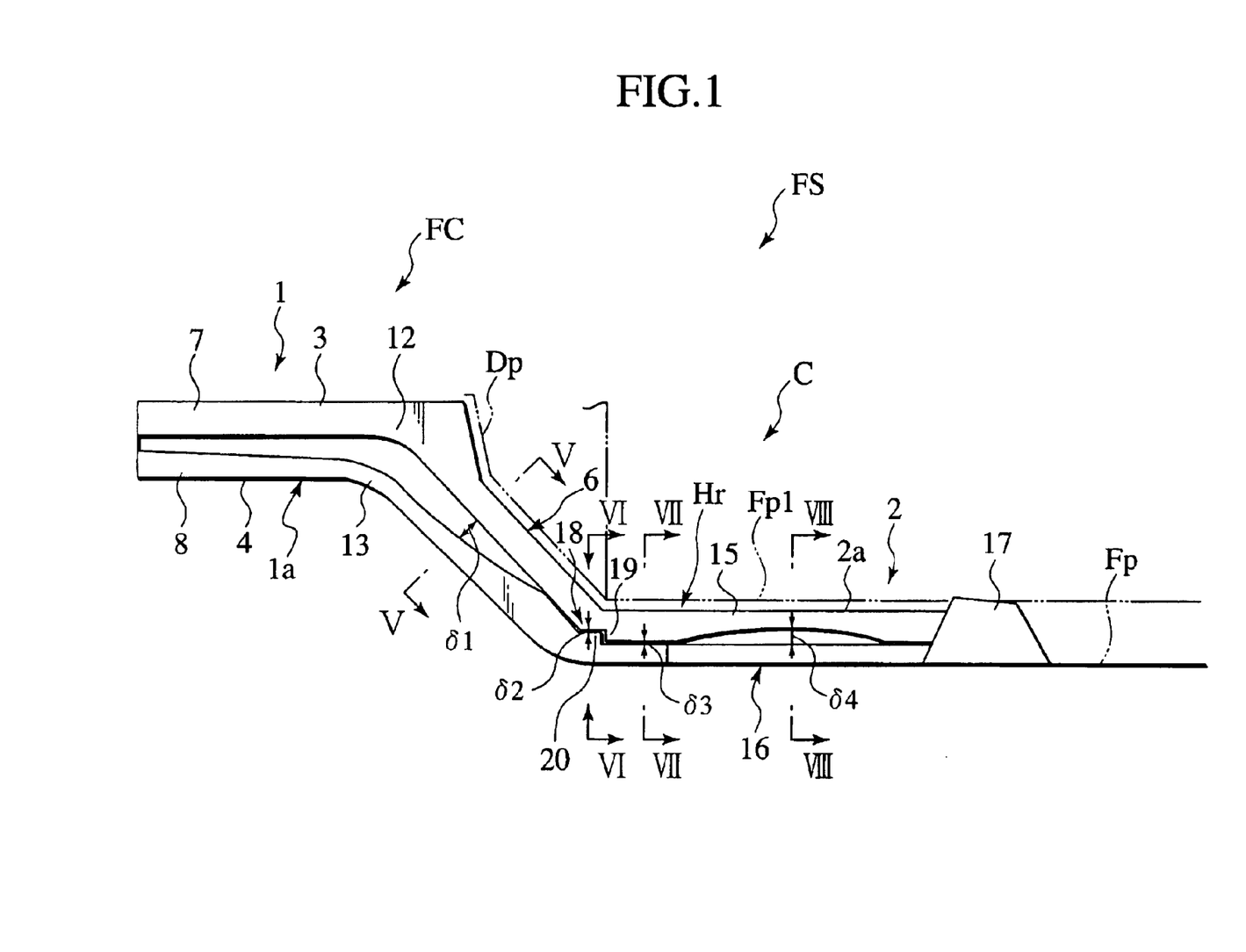
FIG. 1 is a longitudinal sectional view of a vehicular body front structure according to an embodiment of the invention.
Figure 2:
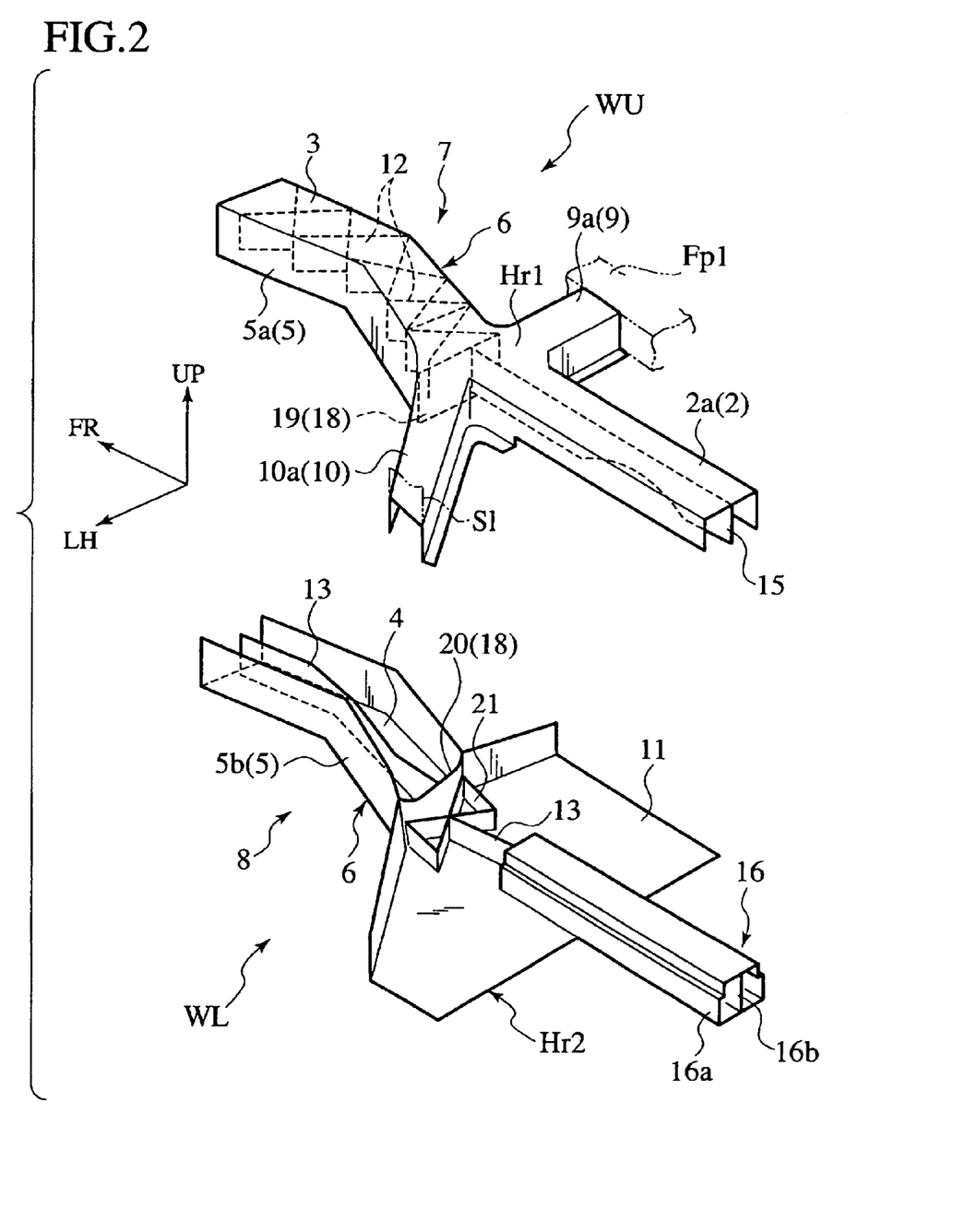
FIG. 2 is an exploded view of the vehicular body front structure.
Figure 3:
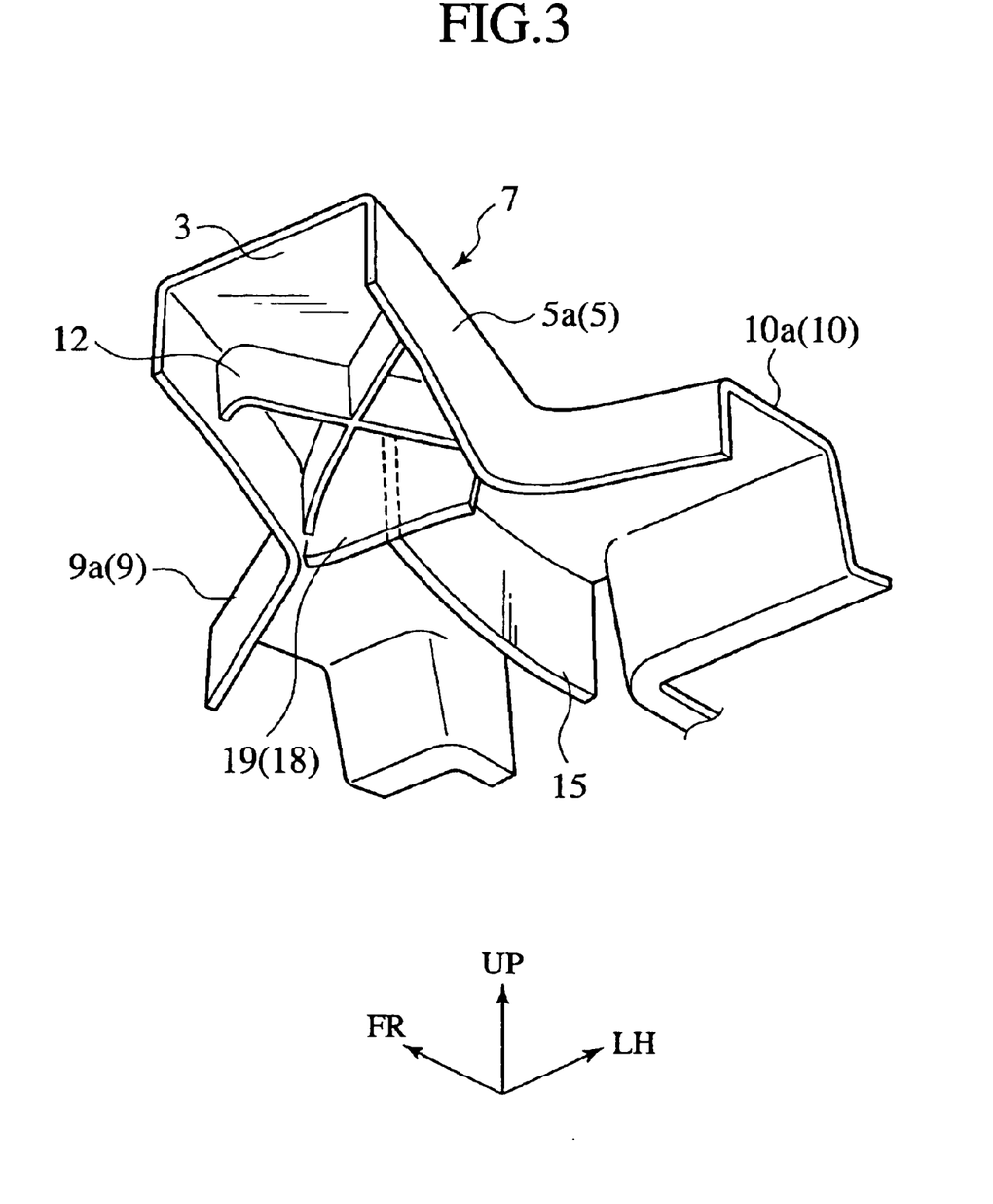
FIG. 3 is a perspective view of an essential portion of an upper wall member of the vehicular body front structure.
Figure 4:
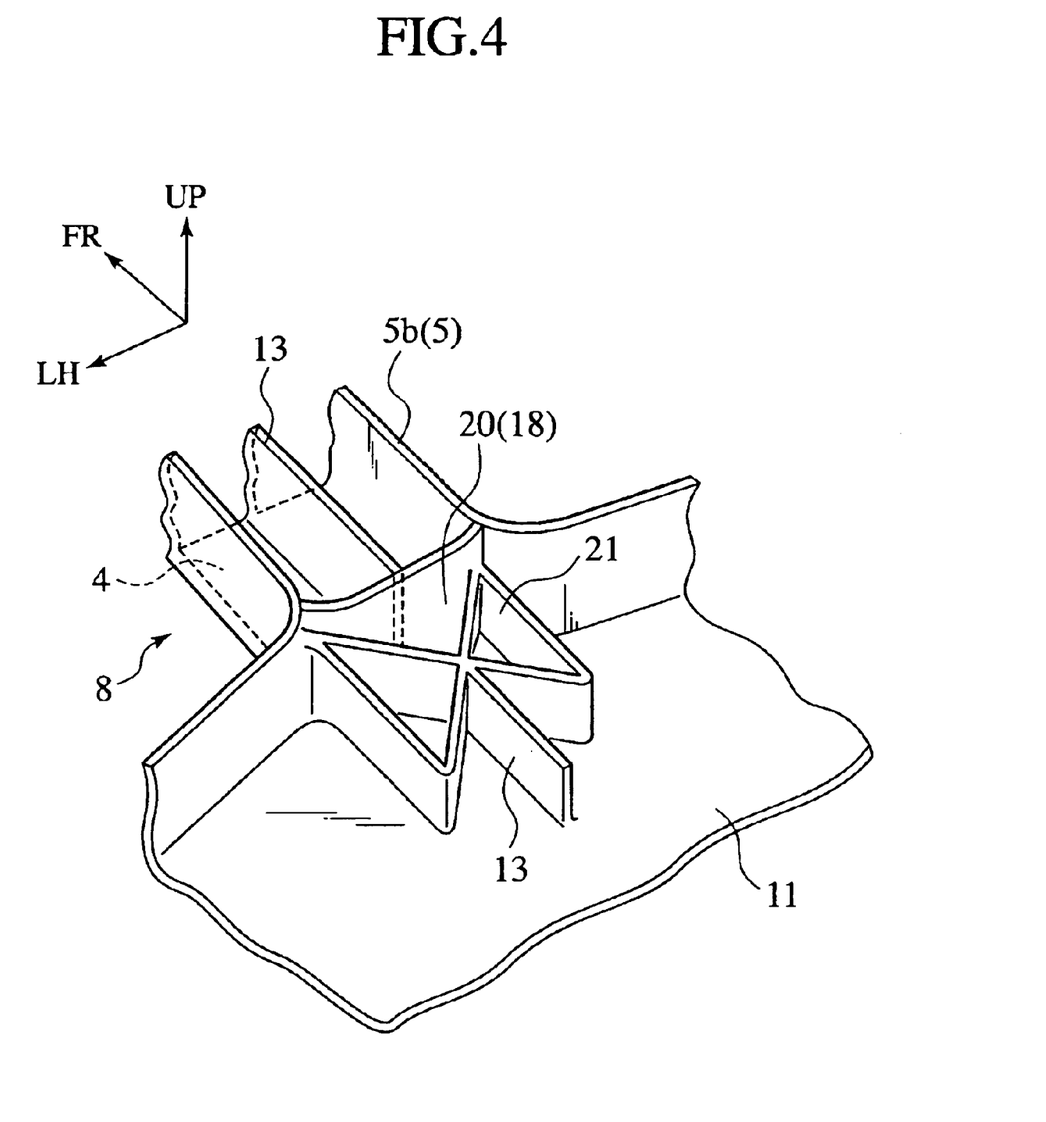
FIG. 4 is a perspective view of an essential portion of a lower wall member of the vehicular body front structure.
Figure 5:
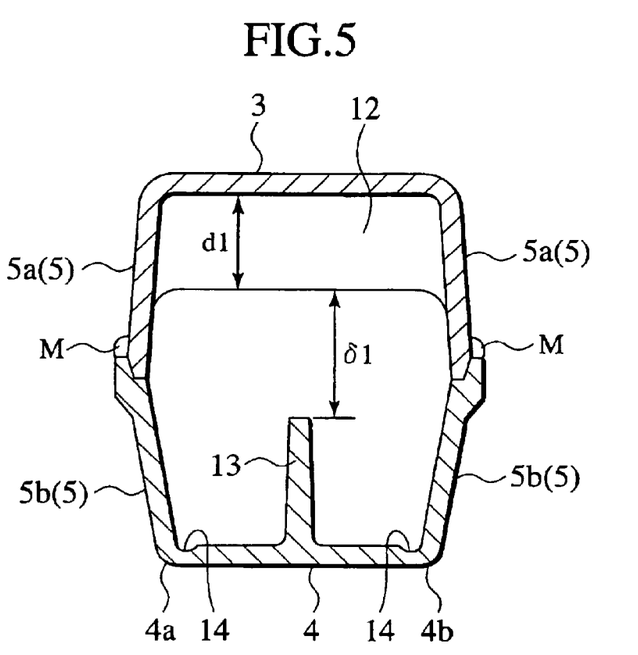
FIG. 5 is a section along line V—V of FIG. 1.
Figure 6:
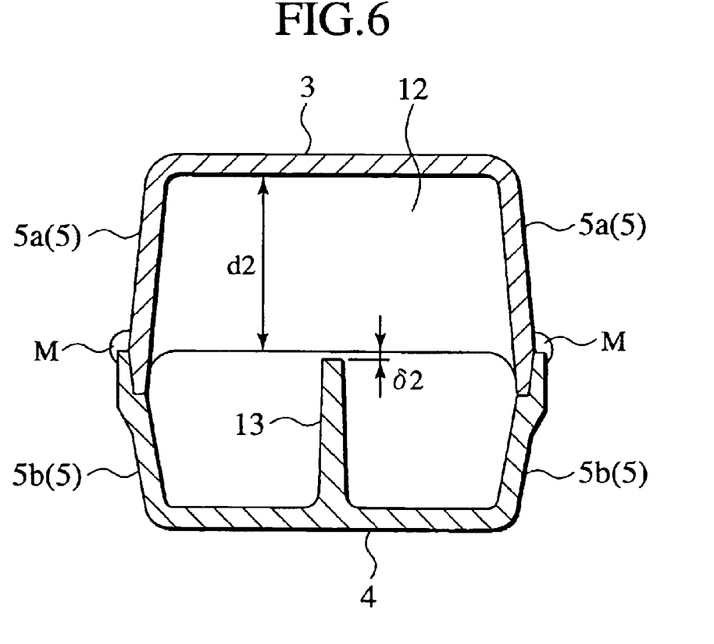
FIG. 6 is a section along line VI—VI of FIG. 1.
Figure 7:
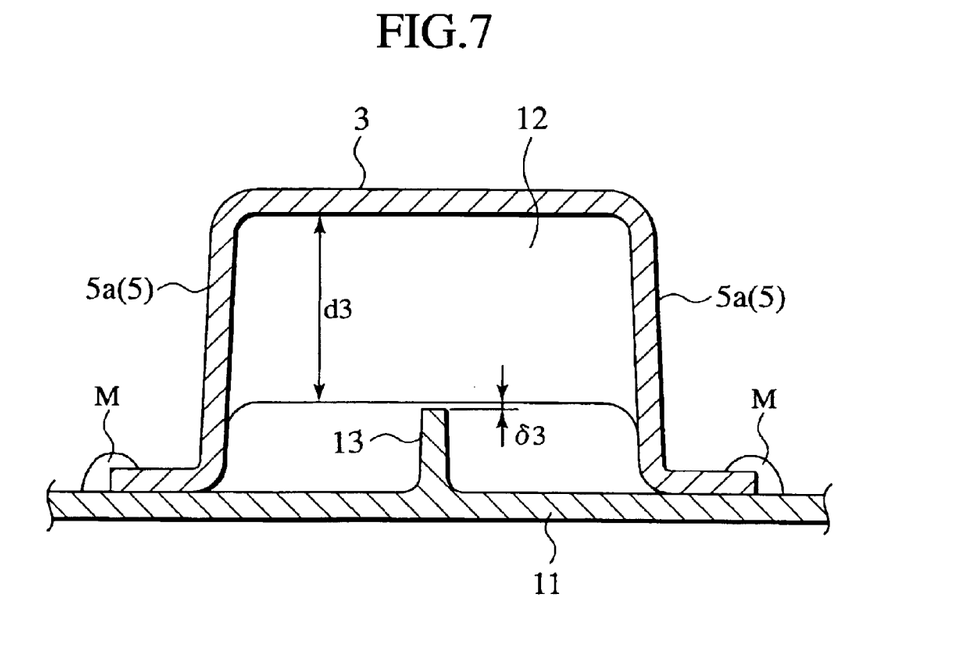
FIG. 7 is a section along line VII—VII of FIG. 1.

FIG. 1 is a longitudinal sectional view of a vehicular body front structure FS according to an embodiment of the invention, and FIG. 2, an exploded view of the front structure FS. FIGS. 3 and 4 are perspective views of upper and lower wall members WU and WL of the structure FS, respectively, and FIGS. 5 to 8 are sections along lines V—V, VI—VI, VII—VII, and VIII—VIII of FIG. 1, respectively. A frontward direction FR, a left hand direction LH and an upper direction UP are defined by arrows.

The vehicular body front structure FS is configured with a pair of left and right front side members 1 as structural members of a front or engine compartment FC (FIG. 1) of a vehicle, and a pair of left and right rear horizontal members Hr (FIG. 1) as structural members of a passenger or luggage compartment C (FIG. 1) of the vehicle.

Each front side member 1 has a front horizontal portion 1a (FIG. 1), and a rear inclined portion 6 (FIGS. 1–2) rearwardly descending along a downside outline of a dashboard panel Dp (FIG. 1) that defines the compartment C.

Each rear horizontal member Hr is formed as an extension of the inclined portion 6 of corresponding front side member 1, and extends in a longitudinal direction of the vehicle, up to a tranversely extending intermediate or rear cross member 17 (FIG. 1) of the compartment C, and in a tranverse direction of the vehicle, between a central tunnel portion Fp1 (FIGS. 1–2) of a floor panel Fp (FIG. 1) and a left or right side sill Sl (FIG. 2) of the compartment C.

At each of left and right sides, the front side member 1 and the rear horizontal member Hr are mutually integrated as a single structural member (or enclosure) tubular (or hollow) and rectangular in section. This structural member (1+Hr) is fabricated as a combination of the upper wall member WU (FIG. 2) and the lower wall member WL (FIG. 2) to be joined together by weld M (FIGS. 5–8).

The upper wall member WU includes an upper (channel) member 7 (FIGS. 1–3) of the front side member 1, an upper member 2a (FIGS. 1–2, 8) of a longitudinally extending floor member 2 (FIGS. 1–2, 8), an upper member 9a (FIGS. 2–3) of a transversely extending front cross member 9 (FIGS. 2–3), and an upper member 10a (FIGS. 2–3) of a rearwadly inclined outer rigger member 10 (FIGS. 2–3). The upper member 7 is configured as a channel with an upper wall 3 (FIGS. 1–3, 5–7) and respective upper parts 5a (FIGS. 2–3, 5–7) of both side walls 5 (FIGS. 2–7) of the front side member 1, and is reinforced by X-shaped upper ribs 12 (FIGS. 1–3, 5–7). The upper member 2a of the floor member 2 is configured as a channel, and is reinforced by a longitudinal upper rib 15 (FIGS. 1–3). The upper wall member WU has, at an upper rear end of the inclined portion 6 of the front side member 1, a rib-shaped projection 19 (FIGS. 1–3) as an upper element of a retreat prevention mechanism 18 (FIGS. 1–4) that prevents retreat of lower wall member WL.

Figure 8:
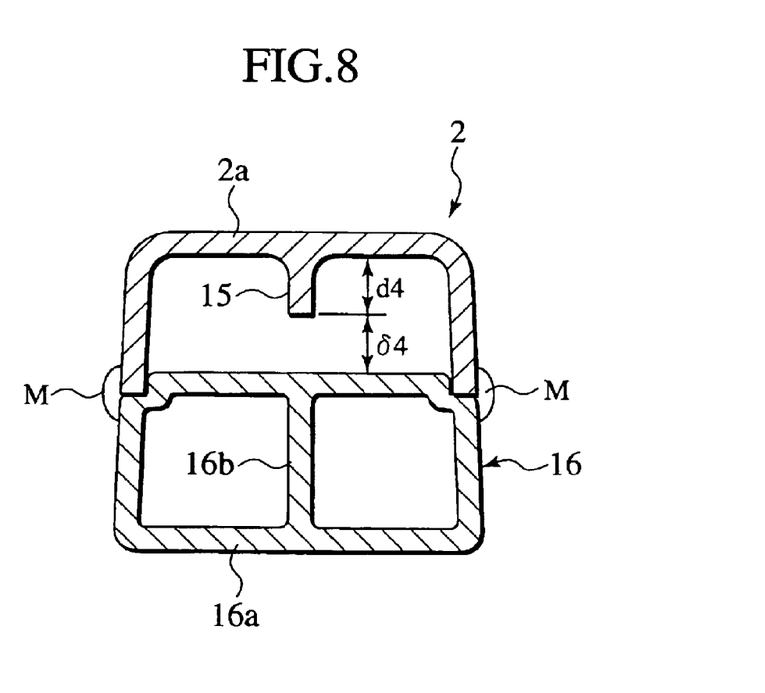
FIG. 8 is a section along line VIII—VIII of FIG. 1.

The lower wall member WL includes a lower (channel) member 8 (FIGS. 1–2, 8) of the front side member 1, a tubular reinforcing member 16 (FIGS. 1–2, 8) as a support member of the floor member 2, and a lower plate 11 (FIGS. 2, 4, 7) as a common base member of the floor member 2, the front cross member 9, and the rigger member 10. The lower member 8 is configured as a channel with a lower wall 4 (FIGS. 1–2, 4–6) and respective lower parts 5b (FIGS. 2, 4–6) of the side walls 5 of the front side member 1, and is reinforced by a front one of longitudinal lower ribs 13 (FIGS. 1–2, 4–7). The lower plate 11 is reinforced by an X-shaped rib 21 (FIGS. 2, 4) and a rear one of longitudinal lower ribs 13. The reinforcing member 16 is configured as a rectangular tubular shell 16a (FIGS. 2, 8) reinforced by a longitudinal center rib 16b (FIGS. 2, 8). The lower wall member WL has, at a lower rear end of the inclined portion 6 of the front side member 1, a rib-shaped projection 20 (FIGS. 1–2, 4) as a lower element of the retreat prevention mechanism 18.

In other words, at each side of the vehicle, the vehicular body front structure FS has the front side member 1 disposed in a front portion of a vehicle body, as shown in FIG. 1, and a portion of the vehicle body located in the rear of front side member 1 extends as the floor member 2 of the compartment C. The front side member 1 is configured with the upper and lower walls 3, 4 connected by both side walls 5, as a structure rectangularly enclosed in section, like the floor member 2.

The front side member 1 is paired to be located at both vehicle-transverse sides of the front compartment FC, extending substantially in parallel to the vehicle-longitudinal direction, and has as a rear part thereof the inclined portion 6 downwardly descending along the dashboard panel Dp, which portion 6 is integrally connected at a rear end thereof to the floor member 2.

In this embodiment, the upper wall 3 of the front side member 1 is made greater in rigidity than the lower part 4 at the inclined portion 6.

The front side member 1 is configured, as shown in FIG. 2, with the upper member 7 shaped in an invert-U form in section by the upper wall 3 and the upper parts 5a of both side walls 5, and the lower member 8 shaped in a U-form in section by the lower wall 4 and the lower parts 5b of both side walls 5, which members 7, 8 are mutually joined by weld M between the side wall upper and lower parts 5a, 5b.

As shown in FIG. 2, the upper member 7 extends to a rear end of the inclined portion 6, wherefrom the upper member 2a is rearwardly extended as an invert-U-shaped upper portion of the floor member 2, the upper member 9a is transversely inwardly formed as an invert-U-shaped upper portion of the cross member 9, and the upper member 10a is transversely outwatdly formed as an invert-U-shaped upper portion of the rearwardly inclined outer rigger member 10.

Also the lower member 8 extends to a rear end of the inclined portion 6, where the lower plate 11 is formed for such an integration of the upper members 2a, 9a, and 10a of floor member 2, cross member 9, and rigger member 10, that a front part of the upper member 2a and respective free-open lower edges of the upper members 9a and 10a are joined to the lower plate 11 by spot welding or the like, whereby a front portion of the floor member 2, as well as the cross member 9 and the rigger member 10, is configured as a structure enclosed in section.

The cross member 9 having an enclosed structure is connected at a transversely inward end thereof to a side wall of the tunnel portion Fp1 of the floor panel Fp. The rigger member 10 having an enclosed structure is connected at a transversely outer end thereof to a front end of the side sill Sl.

The upper and lower members 7, 8 of the front side member 1 are formed as castings of an aluminum alloy, as well as the upper members 2a, 9a, and 10a of floor member 2, cross member 9 and rigger member 10, and the lower plate 11.

In order for the upper wall 3 to be greater in rigidity than the lower wall 4 at the inclined portion 6, this portion 6 has: the upper ribs 12 formed on the upper wall 3, over length thereof, toward an upper end (front end) from a lower end (rear end) of the inclined portion 6, as upper wall deformation controlling elements (or means) configured to restrict or suppress deformation in section due to impact as an imposed load from ahead; and the front lower rib 13 formed on the lower wall 4, over length thereof, toward an upper end (front end) from a lower end (rear end) of the inclined portion 6, as lower wall deformation controlling elements (or means) configured to develop or promote the deformation in section due to impact from ahead.

The upper ribs 12 as well as the front lower rib 13 are provided within an enclosed section of the inclined portion 6. More specifically, the upper ribs 12 are built over length from a front end of the front side member 1 to the rear end of the inclined portion 6, as a plurality of integral projections from an inside of the upper wall 3, each respectively having a crossing form between opposite insides of the upper member 7, i.e. between the upper parts 5a of both side walls 5 of the front side member 1. The front lower rib 13 is built over length from a front end of the front side member 1 to the rear end of the inclined portion 6, along a longitudinal direction of the front side member 1, as an integral central projection from an inside of the lower wall 4.

The upper ribs 12 have their projection amounts or dimensions gradually changed to be different between upper and lower ends of the inclined portion 6, so that a rib 12 at the upper end has a minimized projection amount d1 (FIG. 5) to provide a corresponding clearance $\delta 1$ (FIGS. 1, 5) relative to the front lower rib 13, a rib 12 at a bent or curved part at the lower end has a greater projection amount d2 (FIG. 6) than the projection amount d1 at the upper end to provide a corresponding clearance $\delta 2$ (FIGS. 1, 6) relative to the front lower rib 13, and a rib 12 in the rear of the bent or curved part at the lower end has a still greater projection amount d3 (FIG. 7) than the intermediate projection amount d2 to provide a corresponding clearance $\delta 3$ (FIGS. 1, 7) relative to the front lower rib 13, with such a relationship that d1<d2<d3.

The clearance $\delta 1$ at the upper end is large enough to allow for deformation in section of the lower member 7 due to impact as an imposed load from ahead, while the clearances $\delta 1$, $\delta 2$ at the lower end are minimized to restrict or suppress deformation in section of the lower member 7 due to impact from ahead.

The inclined portion 6 has, at least at the upper end, notches 14 (FIG. 5) formed as weaker parts in both edge parts 4a, 4b (FIG. 5) of the lower wall 4.

Also the floor member 2 has the upper rib 15 formed as a central projection from an inside of the upper member 2a, along a longitudinal direction of the floor member 2.

The upper member 2a of floor member 2 is joined at both sides of free-open lower edges thereof, by weld M, to upper edges at both sides of the reinforcing member 16, and this member 16 is joined as a lower member of the floor member 2 to a central region of an upside of the lower plate 11.

The reinforcing member 16 is made as an extruded aluminum alloy member configured with the outer shell 16a having a rectangular enclosed structure in section, and the center rib 16b interconnecting upper and lower walls of the outer shell 16a.

The floor member 2 is connected at a rear end thereof to the cross member 17, which extends between the left side sill S1 and a right side sill of the vehicle. The center rib 16b has a minimal projection amount d4 (FIG. 8) at an intermediate part of the floor member 2 to provide a great clearance δ4 relative to an upside of the reinforcing member 16, and a maximal projection amount near the cross member 17 to provided a minimal clearance relative to the upside of the reinforcing member 16.

The lower wall retreat prevention mechanism 18 is disposed at the lower end of the inclined portion 6, to prevent the lower wall 4 from retreating relative to the upper wall 3.

The lower wall retreat prevention mechanism 18 is configured with the upper rib-shaped projection 19 descending from the upper wall 3 at the rear end of the inclined portion 6, and the lower rib-shaped projection 20 ascending from the lower wall 4 at the rear end of the inclined portion 6 and abutting on a front side of the upper rib-shaped projection 19.

The projection 19 is connected at a rear end thereof to the upper rib 15 of the floor member 2, and the projection 20 is connected at both sides of a rear end thereof to the X-shaped rib 21 projecting from the upside of the lower plate 11.

Figure 9:
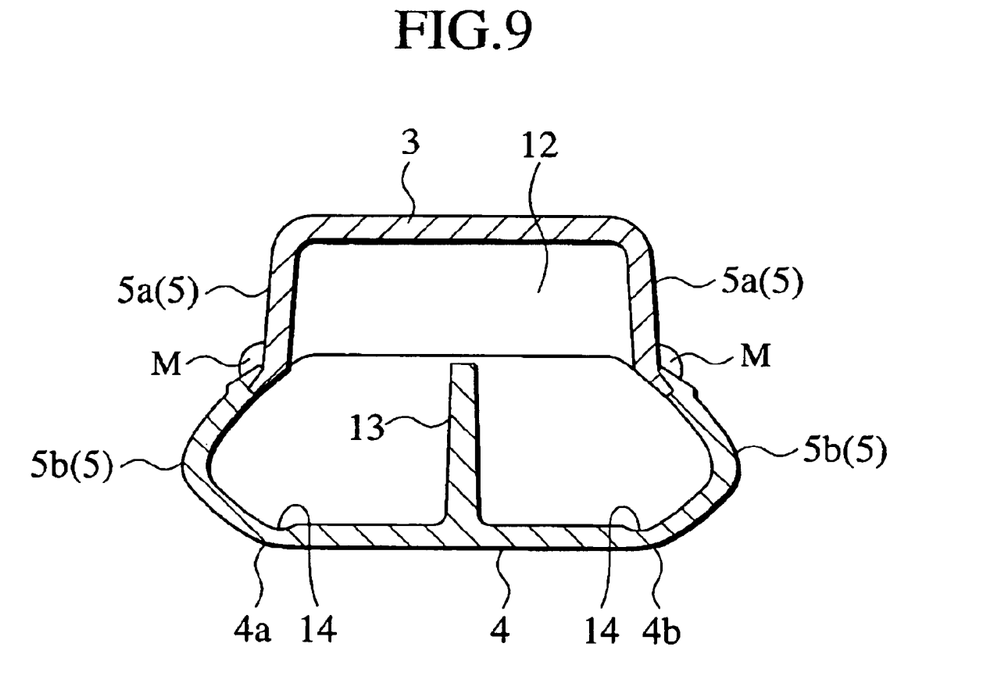
FIG. 9 is a section of an inclined portion of the vehicular body front structure in a deformed condition.
Figure 10:
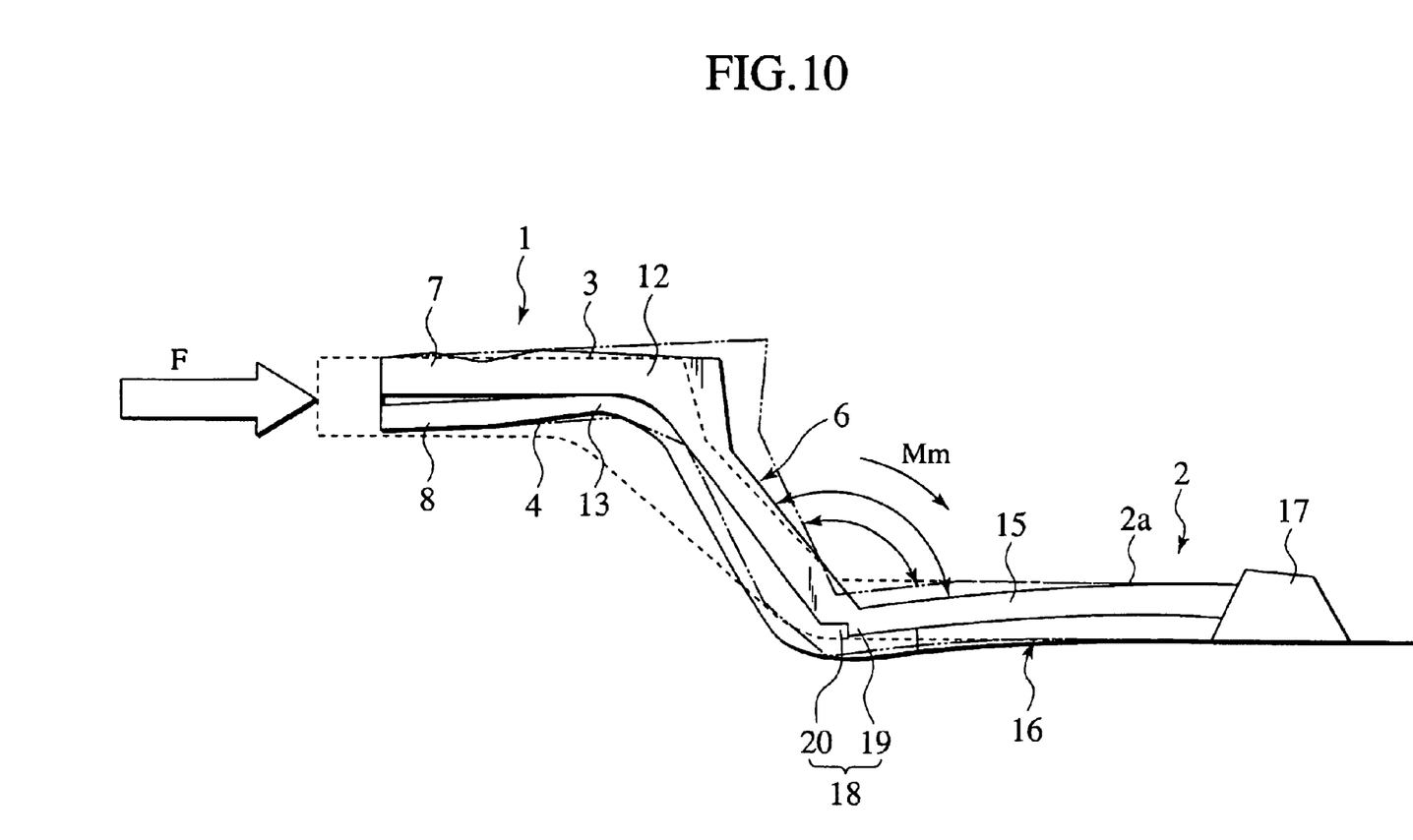
FIG. 10 is a longitudinal section view of the vehicular body front structure in a deformed condition.

Description is now made of deformation in the vehicular body front structure FS, with reference to FIGS. 9 and 10. FIG. 10 shows a longitudinal section of the vehicular body front structure FS in a deformed condition, of which a cross section is shown in FIG. 9.

As a collision impact or load F is imposed on the front side member 1 from ahead, the load F is axially transmitted from the front end of front side member 1, to be input to the inclined portion 6.

Then, the inclined portion 6 has a moment Mm developed about the lower end, with a tendency to deform the upper end rearward. However, in this embodiment which has the upper ribs 12 in the upper member 7, the lower rib 13 in the lower member 8, and the lower wall retreat prevention mechanism 18 at the lower end of the inclined portion 6 and in which the upper wall 3 has a greater rigidity than the lower wall 4 in the inclined portion 6, the lower wall 4 tends to deform, prior to the upper wall 3, so that energy of impact is first absorbed at the lower wall 4 side, i.e. by the lower member 8.

In other words, with the load F imposed, the lower member 8 is deformed, prior to the upper member 7, when the lower rib-shaped projection 20 engages the upper rib-shaped projection 19 of the lower wall retreat prevention mechanism 18, whereby the lower wall 4 is prevented from retreating relative to the upper wall 3, thus causing the front side member 1 to deform in section, absorbing energy of the impact, until the lower rib 13 at the upper end of the inclined portion 6 is brought, through the clearance 61, into abutment with upper rib 12, as shown in FIG. 9.

The deformation in section at the upper end of the inclined portion 6 is assisted by the notches 14 formed as weaker parts in both side edge parts 4a, 4b of the lower wall 4, and helped by thermally influenced regions about weld M by which the upper and lower members 7, 8 are joined together.

At the lower end of the inclined portion 6, where the clearances δ2, δ3 between the upper and lower ribs 12, 13 are minimized, the deformation in section of the front side member 1 is suppressed to be minimal.

Accordingly, the inclined portion 6 of the front side member 1 is adapted at the upper end to have the lower member 8 to greatly deform in section, absorbing impact energy, and at the lower end to have a suppressed deformation in section, so that, between a collision-free normal condition shown by broken lines and a collision condition shown by solid lines in FIG. 10, the amount of a deformation at the inclined portion 6, i.e. the amount of retreat movement that the upper end of the inclined portion 6 has about the lower end, can be minimized In FIG. 10, double-dotted chain lines represent deformation of a conventional front side member.

In the front side member 1, therefore, while the lower wall 4 is deformed by collision, deformation of the inclined portion 6 is suppressed at the upper wall 3 side with an increased rigidity, whereby the dashboard panel Dp extending along the inclined portion 6 can be suppressed in retreat, allowing for a minimized deformation of cabin or compartment C.

The floor member 2 extending rearward of the inclined portion 6 has a great clearance δ4 between the center rib 16b and an upside of the reinforcing member 16 at an intermediate portion thereof, and minimal clearances near the cross member 17, whereby the floor member 2 is allowed to greatly deform in section at the intermediate portion by moment Mm due to collision, causing a front portion thereof to deform, bending downward, thereby additionally absorbing energy, having reduced influences on the cabin.

In this embodiment, therefore, energy is effectively absorbed by deformations in section at the upper end of inclined portion 6 and the intermediate portion of floor member 2, allowing for a retreat motion of the upper end about the lower end of inclined portion 6 to be minimized, effectively reducing retreat of the dashboard panel Dp without the need of extra members such as reinforcements, thus achieving a light-weighted structure.

Further, in this embodiment, the inclined portion 6 is provided at the upper wall 3 side with the upper ribs 12 formed from the lower end of inclined portion 6, toward the upper end, to suppress deformation in section due to imposed load from ahead, and at the lower wall 4 side with the lower rib 13 formed from the lower end of inclined portion 6, toward the upper end, to promote deformation in section due to imposed load from ahead, allowing for clearances δ1, δ2, δ3 to be adjusted between the upper and lower ribs 12, 13, so that deformation in section of the inclined portion 6 can be controlled to effectively suppress retreat of dashboard panel Dp.

The inclined portion 6 has at the lower end the lower wall retreat prevention mechanism 18 for preventing retreat of the lower wall 4 relative to the upper wall 3, whereby upon deformation of lower wall 4 prior to upper wall 3, the relative retreat of lower wall 4 to upper wall 3 can be prevented, allowing for an ensured deformation of lower wall 4.

The front side member 1 made as an aluminum alloy cast is light-weighted.

The upper ribs 12 as upper wall deformation control elements and the lower rib 13 as lower wall deformation control element are integrally formed within an enclosed section of inclined portion 6, without increase in number of components, allowing for improved operation in vehicle body assembly work.

The inclined portion 6 has, at least at the upper end, the notches 14 formed at both side edges 4a, 4b of lower wall 4, as weaker parts assisting deformation in section of inclined portion 6, allowing for an enhanced absorption of impact energy.

The upper member 7 invert-U-shaped in section and the lower member 8 U-shaped in section are joined together to constitute the front side member 1 with an increased tendency for the upper and lower members 7, 8 to relatively deform, allowing for the lower member 8 to have a priority of deformation in section, so that the inclined portion 6 can be suppressed to retreat, thereby suppressing retreat of dashboard panel DP.

The upper member 7 and the lower member 8 are joined by weld M having thermal influences, so that associated regions are made weaker, allowing the front side member 1 to have an increased tendency to deform in section.

The lower wall retreat prevention mechanism 18 is constituted as a combination of the upper rib-shaped projection 19 descending from the upper wall 3 at eh lower end of inclined portion 6 and the lower rib-shaped projection 20 ascending from the lower wall 4 at the lower end of inclined portion 6 and abutting on a front side of the upper rib-shaped projection 19, allowing for efficient prevention of retreat of lower wall 4 by a simple structure to be achieved with reduced deformation at the lower end of inclined portion 6 to effect an ensured suppression of retreat of dashboard panel Dp.

The contents of Japanese Patent Application No. 2003-16057 are incorporated herein by reference.

While embodiment of the present invention has been described using specific terms, such description is for illustrative purposes, and it is to be understood that changes and variations may be made without departing from the spirit or scope of the following claims.

What is claimed is:

1. A vehicular body front structure comprising:
    a vehicle-longitudinally extending front side member having a rearwardly descending inclined portion configured in an enclosure form in section with an upper wall and a lower wall, the upper wall being more rigid than the lower wall;
    a first control element configured to suppress deformation in section of the inclined portion; and
    a second control element configured to promote deformation in section of the inclined portion, wherein
    the first control element comprises a first rib extending in an X-form in the inclined portion, and
    the second control element comprises a second rib longitudinally extending in the inclined portion.

2. A vehicular body front structure according to claim 1, further comprising a retreat preventer configured to prevent the lower wall from retreating relative to the upper wall.

3. A vehicular body front structure according to claim 1, wherein the inclined portion is formed at an upper end thereof with a weaker part on an edge of the lower wall.

4. A vehicular body front structure according to claim 1, wherein the front side member comprises an upper channel member including the upper wall, and a lower channel member including the lower wall.

5. A vehicular body front structure according to claim 1, wherein the front side member is a cast of light metal alloy.

6. A vehicular body front structure according to claim 1, wherein the first rib is configured to be brought into abutment on the second rib in deformation of the inclined portion, and the second rib has a varied clearance to the first rib as the second rib longitudinally extends.

* * * * *